(12) United States Patent
Zhou

(10) Patent No.: US 9,054,529 B2
(45) Date of Patent: Jun. 9, 2015

(54) BATTERY PROTECTION CIRCUIT AND METHOD THEREOF

(75) Inventor: Jun Zhou, Shanghai (CN)

(73) Assignee: DONGGUAN CELLWISE MICROELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 13/698,529

(22) PCT Filed: Mar. 21, 2012

(86) PCT No.: PCT/CN2012/072720
§ 371 (c)(1),
(2), (4) Date: Nov. 16, 2012

(87) PCT Pub. No.: WO2013/107089
PCT Pub. Date: Jul. 25, 2013

(65) Prior Publication Data
US 2014/0285934 A1      Sep. 25, 2014

(30) Foreign Application Priority Data

Jan. 17, 2012  (CN) .......................... 2012 1 0016924

(51) Int. Cl.
*H02H 7/18* (2006.01)
*H02J 7/00* (2006.01)

(52) U.S. Cl.
CPC .............. *H02H 7/18* (2013.01); *H02J 7/0029* (2013.01)

(58) Field of Classification Search
CPC ............ H02H 7/18; H02J 7/0031; G06F 1/28
USPC ........................................................ 361/78
See application file for complete search history.

(56) References Cited

U.S. PATENT DOCUMENTS

| 2008/0042618 A1* | 2/2008 | Cromer et al. ................ 320/134 |
| 2011/0163723 A1* | 7/2011 | Tan et al. ....................... 320/134 |

FOREIGN PATENT DOCUMENTS

| CN | 1489252 A | 4/2004 |
| CN | 1967966 A | 5/2007 |
| CN | 102217118 A | 10/2011 |

OTHER PUBLICATIONS

Translation of Wei, Ran et al., Protection Circuit of Lithium-ion Battery Based on Software and Hardware, Chinese Journal of Power Sources, 2006, 971-972 & 981, vol. 30, No. 12.*
Wei, Ran et al., Protection circuit of lithium-ion battery based on software and hardware, Chinese Journal of Power Sources, 2006, 971-972 & 981, vol. 30, No. 12.
International Search Report, Nov. 8, 2012, based on International application No. PCT/CN2012/072720.

* cited by examiner

*Primary Examiner* — Thienvu Tran
*Assistant Examiner* — Kevin J Comber
(74) *Attorney, Agent, or Firm* — Tim Tingkang Xia, Esq.; Morris, Manning & Martin, LLP

(57) ABSTRACT

The present disclosure discloses a battery protection circuit and a method thereof for protecting a battery pack. The battery protection circuit comprises a hardware protection circuit, a software protection circuit and a current detecting circuit. When the battery pack is not in the active status, the hardware protection circuit is used to execute a protective operation; and when the battery pack is in the active status, the software protection circuit is used to execute the protective operation. Furthermore, the hardware protection circuit is electrically connected to the software protection circuit to detect a status of the software protection circuit. When the battery pack is in the active status, the software protection circuit is used to execute the protective operation, and when the software protection circuit is in an abnormal status, the hardware protection circuit is used instead to execute the protective operation.

12 Claims, 3 Drawing Sheets

BATTERY PROTECTION CIRCUIT AND METHOD THEREOF

FIELD OF THE INVENTION

The present disclosure generally relates to the technical field of battery management, and more particularly, to a battery protection circuit and a method thereof for use in a battery management system (BMS).

BACKGROUND OF THE INVENTION

During use of batteries, abnormal conditions that threaten safety of the batteries such as overcharging, over-discharging, charging or discharging at an overlarge current often occur. These abnormal conditions have a serious effect on the service life of the batteries and may even cause serious problems such as electrolyte leakage or explosion of the batteries. In order to avoid these abnormal conditions, a battery protection circuit is usually disposed in a battery management system to protect the batteries.

Current battery protection circuits usually operate in two way: the software and the hardware. A battery protection circuit of the software type uses software/MCU to acquire a voltage of a battery, compares the voltage with a preset threshold and then takes a corresponding protective action; and a battery protection circuit of the hardware type uses a comparator to provide a fixed threshold for comparison and then takes a corresponding protective action.

The battery protection circuit of the software type is flexible to use because the protection program thereof can be altered for many times, and the preset threshold can be adjusted depending on different battery types and different demands. However, it has a relatively large overall power consumption, and is easily to be interfered or fleeting, each one of these makes it impossible to provide normal protection any longer. On the other hand, the battery protection circuit of the hardware type features stable operation, but is less flexible to use because it cannot be adjusted efficiently depending on the customer's practical needs and does not allow for alteration of parameters.

Additionally, in order to ensure the battery safety, a redundant battery protection circuits may be disposed in some battery management systems. For example, two battery protection circuits in a hardware form, or one battery protection circuit in a software form in combination with one battery protection circuit in a hardware form are used. However, such a redundant protection scheme considerably increases the power consumption and the cost of the system.

Accordingly, an urgent need exists in the art to develop a novel battery protection circuit that can improve the aforesaid problems.

SUMMARY OF THE INVENTION

A primary objective of the present disclosure is to provide a battery protection circuit which features a low power consumption and a high protection capability.

To achieve the aforesaid objective, the present disclosure provides a battery protection circuit for protecting a battery pack, which comprises: a hardware protection circuit, comprising at least one comparator, a reference voltage source and a first output control module, wherein each of the at least one comparator has an input terminal electrically connected to one battery unit in the battery pack to acquire a voltage of the battery unit, and has the other input terminal electrically connected to the reference voltage source to use a reference voltage of the reference voltage source as a fixed threshold, the comparator is configured to compare the voltage of the battery unit with the fixed threshold to generate a corresponding comparison result at an output terminal thereof, and the first output control module is configured to receive the comparison result and take a corresponding protective action; a software protection circuit, comprising an analog-to-digital converter (ADC) module, a threshold setting module, a logic module and a second output control module, wherein the ADC module is configured to acquire a voltage of each of battery units in the battery pack and convert it into a digital signal, the threshold setting module is for use by a user to set a preset threshold, the logic module is configured to compare the preset threshold with the digital signal to generate a corresponding comparison result, and the second output control module is configured to receive the comparison result and take a corresponding protective action; and a current detecting circuit, comprising a current detecting element and a current detecting module, wherein the current detecting module is connected in parallel with the current detecting element to detect for a current flowing through the current detecting element, and wherein if a current flowing through the current detecting element is detected by the current detecting module, then the battery pack is in an active status; and if no current flowing through the current detecting element is detected by the current detecting module or if the current flowing through the current detecting element is smaller than the preset threshold, then the battery pack is in inactive status. The current detecting circuit is configured to detect whether the battery pack is in the active status. When the battery pack is not in the active status, the hardware protection circuit is used to execute a protective operation so as to provide necessary protection and reduce the power consumption; and when the battery pack is in the active status, the software protection circuit is used to execute the protective operation so as to provide flexible operation and protection.

Preferably, the hardware protection circuit is electrically connected to the software protection circuit to detect a status of the software protection circuit, and when the battery pack is in the active status, the software protection circuit is used to execute the protective operation, and when the software protection circuit is in an abnormal status, the hardware protection circuit is used instead to execute the protective operation.

Preferably, the current detecting element is a current detecting resistor, a metal oxide semiconductor (MOS) transistor, a current mirror circuit or a battery itself.

To achieve the aforesaid objective, the present disclosure further provides a battery protection circuit for protecting a battery pack, which comprises a hardware protection circuit, a software protection circuit and a current detecting circuit. The current detecting circuit is configured to detect whether the battery pack is in an active status. When the battery pack is not in the active status, the hardware protection circuit is used to execute the protective operation; and when the battery pack is in the active status, the software protection circuit is used to execute the protective operation.

Preferably, the hardware protection circuit is electrically connected to the software protection circuit to detect a status of the software protection circuit; and when the battery pack is in the active status, the software protection circuit is used to execute the protective operation, and when the software protection circuit is in an abnormal status, the hardware protection circuit is used instead to execute the protective operation.

Preferably, the current detecting circuit comprises a current detecting element and a current detecting module, the current detecting module is connected in parallel with the current detecting element to detect for a current flowing through the current detecting element, and if a current flowing through the current detecting element is detected by the current detecting module, then the battery pack is in the active status; and if no current flowing through the current detecting element is detected by the current detecting module or if the current flowing through the current detecting element is smaller than a preset threshold, then the battery pack is not in the active status.

Preferably, the current detecting element is a current detecting resistor, an MOS transistor, a current mirror circuit or a battery itself.

Preferably, the hardware protection circuit comprises at least one comparator, a reference voltage source and a first output control module, each of the at least one comparator has an input terminal electrically connected to one battery unit in the battery pack to acquire a voltage of the battery unit, and has the other input terminal electrically connected to the reference voltage source to use a reference voltage of the reference voltage source as a fixed threshold, the comparator is configured to compare the voltage of the battery unit with the fixed threshold to generate a corresponding comparison result at an output terminal thereof, and the first output control module is configured to receive the comparison result and take a corresponding protective action.

Preferably, the software protection circuit is a Microcomputer circuit.

Preferably, the software protection circuit comprises an ADC module, a threshold setting module, a logic module and a second output control module, the ADC module is configured to acquire a voltage of each of battery units in the battery pack and convert it into a digital signal, the threshold setting module is for use by a user to set a preset threshold, the logic module is configured to compare the preset threshold with the digital signal to generate a corresponding comparison result, and the second output control module is configured to receive the comparison result and take a corresponding protective action.

To achieve the aforesaid objective, the present disclosure further provides a battery protection method for use in a battery protection circuit to protect a battery pack. The battery protection circuit comprises a hardware protection circuit, a software protection circuit and a current detecting circuit. The battery protection method comprises: using the current detecting circuit to detect whether the battery pack is in an active status; using the hardware protection circuit to execute a protective operation if it is detected that the battery pack is not in the active status; and using the software protection circuit to execute the protective operation if it is detected that the battery pack is in the active status.

Preferably, the step of using the software protection circuit to execute the protective operation if it is detected that the battery pack is in the active status further comprises: detecting for an abnormal status of the software protection circuit; if it is detected that the software protection circuit is not in the abnormal status, then continuing to use the software protection circuit to execute the protective operation; and if it is detected that the software protection circuit is in the abnormal status, then using the hardware protection circuit instead to execute the protective operation.

As compared to the prior art, the present disclosure has the following benefits: the battery protection circuit of the present disclosure comprises both a hardware protection circuit and a software protection circuit, and can use the current detecting module to detect whether the battery pack is in an active status. When the battery pack is not in the active status, the hardware protection circuit is used to protect the battery pack so as to reduce the power consumption; and when the battery pack is in the active status, the software protection circuit is used instead to provide flexible protection for the battery pack. Furthermore, the present disclosure also detects a status of the software protection circuit, and enables the hardware protection circuit to protect the battery pack if the software protection circuit is in an abnormal status. Thereby, the battery protection circuit of the present disclosure can protect the battery pack safely.

DETAILED DESCRIPTION OF THE INVENTION

In order to further describe the technical solutions adopted to achieve the objectives of the present disclosure and the efficacies thereof, implementations, methods, steps, structures, features and efficacies of the battery protection circuit and the method thereof according to the present disclosure will be detailed herein below with reference to the attached drawings and preferred embodiments thereof. The aforesaid and other technical disclosures, features and efficacies of the present disclosure will become apparent from the following detailed description of the preferred embodiments that is made with reference to the attached drawings. The technical solutions and the efficacies thereof will be better understood by those of ordinary skill in the art upon reviewing the following description. However, the attached drawings are only provided for illustration purpose but not to limit the present disclosure.

Figure 1:
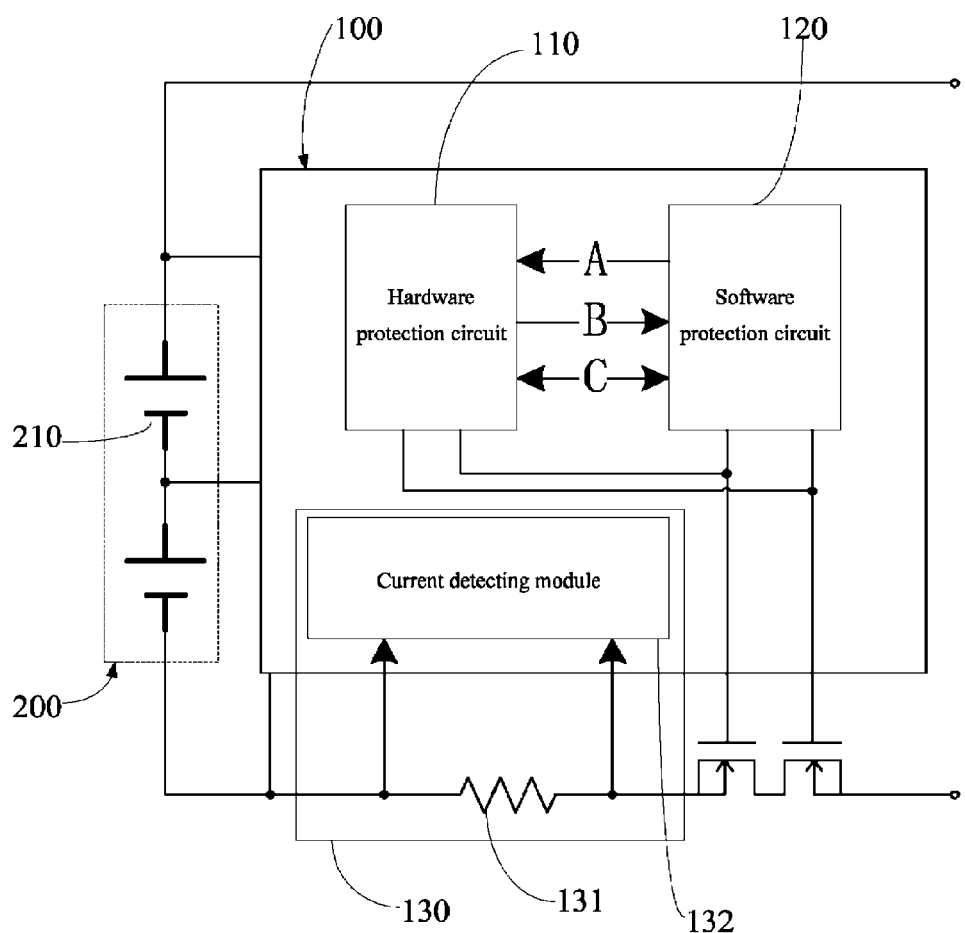
FIG. 1 is a schematic view of a battery protection circuit according to a preferred embodiment of the present disclosure.

FIG. 1 is a schematic view of a battery protection circuit according to a preferred embodiment of the present disclosure. As shown in FIG. 1, the battery protection circuit 100 of the present disclosure is electrically connected to a battery pack 200 to protect the battery pack 200. The battery protection circuit 100 comprises a hardware protection circuit 110, a software protection circuit 120 and a current detecting circuit 130.

Figure 2:
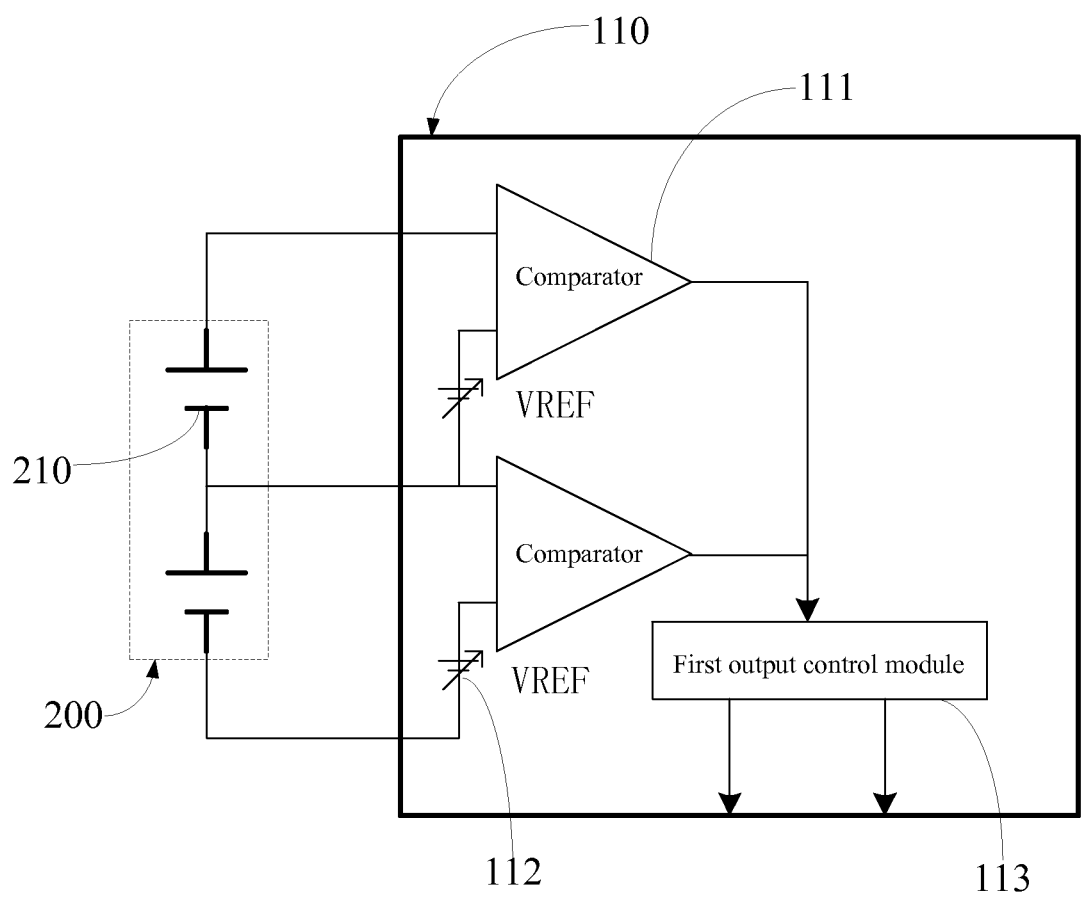
FIG. 2 is a schematic detailed view of a hardware protection circuit shown in FIG. 1.

The hardware protection circuit 110 protects the battery pack 200 through use of hardware. FIG. 2 is a schematic detailed view of the hardware protection circuit 110. As shown in FIG. 2, the hardware protection circuit 110 comprises a plurality of comparators 111, a reference voltage source 112 and a first output control module 113. Each of the comparators 111 corresponds to a corresponding battery unit 210 in the battery pack 200. Each of the comparators 111 has an input terminal electrically connected to an anode of the corresponding battery unit 210, has the other input terminal electrically connected to a cathode of the corresponding battery unit 210 through the reference voltage source 112, and has an output terminal electrically connected to the first output control module 113. That is, each of the comparators 111 uses an input terminal thereof to acquire a voltage of the corresponding battery unit 210 and uses the other input terminal to receive a reference voltage VREF of the reference voltage source 112 as a fixed threshold. Thus, the comparator 111 compares the voltage of the corresponding battery unit 210 with the reference voltage VREF acting as the fixed threshold to generate a corresponding result. The first output control module 113 receives the comparison result generated at the output terminal of the comparator 111 and takes a corresponding protective action. Furthermore, it will be appreciated by people skilled in the art that, it is possible that the detection signal inputted by the comparator is not the battery voltage itself but is a buffered voltage or an attenuated voltage that has passed through other current paths; and the reference voltage source 112 may refer to the cathode or the anode of the battery unit 210, or may refer to the ground, or may be designed to refer to any other voltage level.

Figure 3:
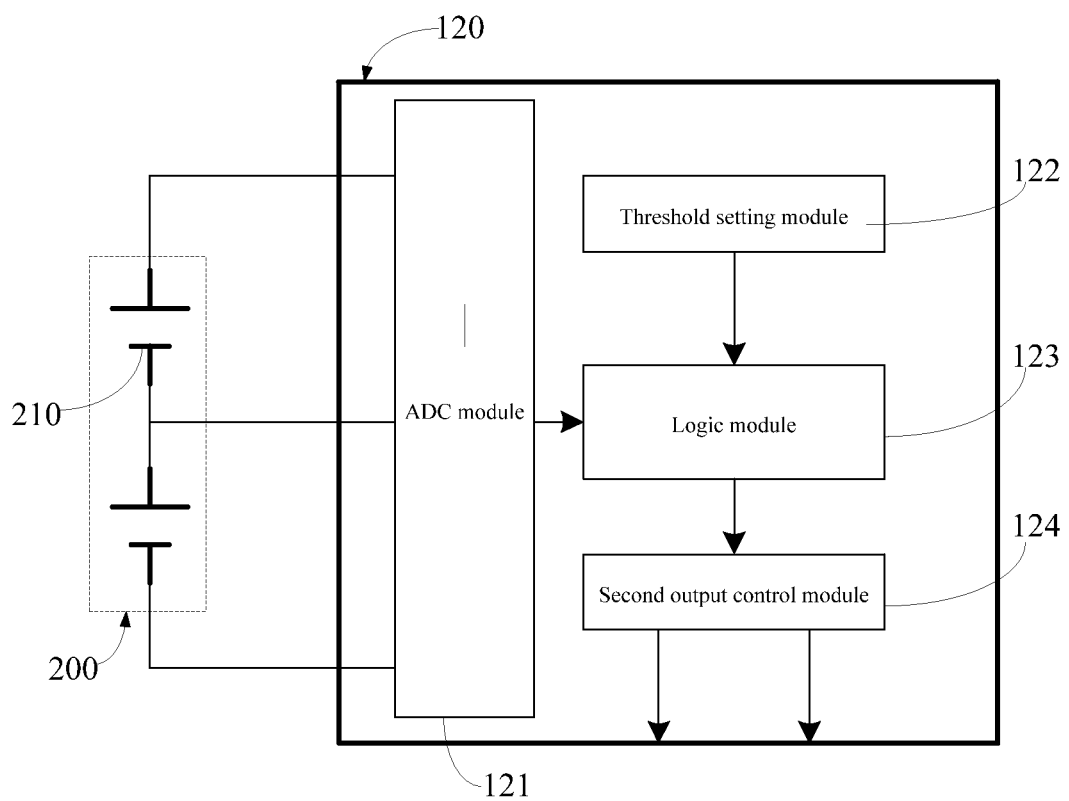
FIG. 3 is a schematic detailed view of a software protection circuit shown in FIG. 1.

The software protection circuit 120 protects the battery pack 200 through use of software, and may be implemented by a Microcomputer circuit. FIG. 3 is a schematic detailed view of the software protection circuit 120. As shown in FIG. 3, the software protection circuit 120 may comprise an analog-to-digital converter (ADC) module 121, a threshold setting module 122, a logic module 123 and a second output control module 124. The ADC module 121 is configured to acquire a voltage of each of battery units 210 in the battery pack 200 and convert it into a digital signal. The threshold setting module 122 is for use by a user to set a preset threshold. The logic module 123 is configured to compare the preset threshold set by the threshold setting module 122 with the digital signal generated by the ADC module 121 to generate a corresponding comparison result. The second output control module 124 is configured to receive the comparison result generated by the logic module 123 and take a corresponding protective action.

Referring to FIG. 1 again, the current detecting circuit 130 is configured to detect whether the battery pack 200 is in an active status. When the battery pack is not in the active status, the hardware protection circuit 110 is used to execute a protective operation; and when the battery pack is in the active status, the software protection circuit 120 is used to execute the protective operation.

Specifically, the current detecting circuit 130 comprises a current detecting element 131 and a current detecting module 132. In this embodiment, the current detecting element 131 may be implemented by a current detecting resistor. The current detecting module 132 is connected in parallel with the current detecting resistor 131 to detect for a current flowing through the current detecting element 131. If a current flowing through the current detecting element 131 is detected by the current detecting module 132, then the battery pack 200 is in the active status; and in this case, the software protection circuit 120 can be activated to execute the protective operation to protect the battery pack 200. If no current flowing through the current detecting element 131 is detected by the current detecting module 132 or if the current flowing through the current detecting element 131 is smaller than the preset threshold, then the battery pack 200 is not in the active status; and in this case, the hardware protection circuit 110 is used to execute the protective operation to protect the battery pack 200. Furthermore, it shall be appreciated by people skilled in the art that, the current detecting element 131 may also be implemented by such devices as a metal oxide semiconductor (MOS) transistor, a current mirror circuit or the battery itself.

That is, in the present disclosure, when the battery pack 200 is not in the active status, using the hardware protection circuit 110 to provide general protection will suffice without the need of using the software protection circuit 120 to provide flexible and complex protection. Because the hardware protection circuit 110 has a low power consumption and high reliability, the battery protection circuit 100 of the present disclosure has a low power consumption when the battery pack 200 does not operate (i.e., is in a static mode).

When the battery pack 200 operates, the software protection circuit 120 can be activated to provide flexible and complex protection so as to better protect the battery pack 200. In this case, the hardware protection circuit 110 may be turned off so as to reduce the power consumption of the battery protection circuit 100.

In the present disclosure, the hardware protection circuit 110 may also be electrically connected to the software protection circuit 120 to detect a status of the software protection circuit 120. The hardware protection circuit 110 may detect the status of the software protection circuit 120 through signal communication (e.g., through three interactive signals A, B, C shown in FIG. 1). If the software protection circuit 120 is in an abnormal status such as a locked status or an inactive status due to interferences or other unexpected conditions, the hardware protection circuit 110 may be activated immediately to execute the protective operation to provide absolutely safe protection for the battery pack 200. Although the hardware protection circuit 110 detects the status of the software protection circuit 120 through the three interactive signals A, B, C in this embodiment, it shall be appreciated by people skilled in the art that, the hardware protection circuit 110 may also detect the status of the software protection circuit 120 through one interactive signal or any other number of interactive signals.

According to the above descriptions, the battery protection circuit of the present disclosure comprises both a hardware protection circuit and a software protection circuit, and can use the current detecting module to detect whether the battery pack is in an active status. When the battery pack is not in the active status, the hardware protection circuit is used to protect the battery pack so as to reduce the power consumption; and when the battery pack is in the active status, the software protection circuit is used instead to provide flexible protection for the battery pack. Furthermore, the present disclosure also detects a status of the software protection circuit, and enables the hardware protection circuit to protect the battery pack if the software protection circuit is in an abnormal status. Thereby, the battery protection circuit of the present disclosure can protect the battery pack safely.

What described above are only some of the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A battery protection circuit for protecting a battery pack, comprising:
    a hardware protection circuit, comprising at least one comparator, a reference voltage source and a first output control module, wherein each of the at least one comparator has an input terminal electrically connected to one battery unit in the battery pack to acquire a voltage of the battery unit, and has the other input terminal electrically connected to the reference voltage source to use a reference voltage of the reference voltage source as a fixed threshold, the comparator is configured to compare the voltage of the battery unit with the fixed threshold to generate a corresponding comparison result at an output terminal thereof, and the first output control module is configured to receive the comparison result and take a corresponding protective action;
    a software protection circuit, comprising an analog-to-digital converter (ADC) module, a threshold setting module, a logic module and a second output control module, wherein the ADC module is configured to acquire a voltage of each of battery units in the battery pack and convert it into a digital signal, the threshold setting module is for use by a user to set a preset threshold, the logic module is configured to compare the preset threshold with the digital signal to generate a corresponding comparison result, and the second output control module is configured to receive the comparison result and take a corresponding protective action; and a current detecting circuit, comprising a current detecting element and a current detecting module, wherein the current detecting module is connected in parallel with the current detecting element to detect for a current flowing through the current detecting element, and wherein if a current flowing through the current detecting element is detected by the current detecting module, then the battery pack is in an active status; and if no current flowing through the current detecting element is detected by the current detecting module or if the current flowing through the current detecting element is smaller than the preset threshold, then the battery pack is not in the active status, wherein the current detecting circuit is configured to detect whether the battery pack is in the active status, and when the battery pack is not in the active status, the hardware protection circuit is used to execute a protective operation; and when the battery pack is in the active status, the software protection circuit is used to execute the protective operation.

2. The battery protection circuit of claim 1, wherein the hardware protection circuit is electrically connected to the software protection circuit to detect a status of the software protection circuit, and wherein when the battery pack is in the active status, the software protection circuit is used to execute the protective operation, and when the software protection circuit is in an abnormal status, the hardware protection circuit is used instead to execute the protective operation.

3. The battery protection circuit of claim 1, wherein the current detecting element is a current detecting resistor, a metal oxide semiconductor (MOS) transistor, a current mirror circuit or a battery itself.

4. A battery protection circuit for protecting a battery pack, comprising a hardware protection circuit, a software protection circuit and a current detecting circuit, wherein the current detecting circuit is configured to detect whether the battery pack is in an active status, and when the battery pack is not in the active status, the hardware protection circuit is used to execute a protective operation; and when the battery pack is in the active status, the software protection circuit is used to execute the protective operation.

5. The battery protection circuit of claim 4, wherein the hardware protection circuit is electrically connected to the software protection circuit to detect a status of the software protection circuit, and wherein when the battery pack is in the active status, the software protection circuit is used to execute the protective operation, and when the software protection circuit is in an abnormal status, the hardware protection circuit is used instead to execute the protective operation.

6. The battery protection circuit of claim 4, wherein the current detecting circuit comprises a current detecting element and a current detecting module, the current detecting module is connected in parallel with the current detecting element to detect for a current flowing through the current detecting element, and wherein if a current flowing through the current detecting element is detected by the current detecting module, then the battery pack is in the active status; and if no current flowing through the current detecting element is detected by the current detecting module or if the current flowing through the current detecting element is smaller than a preset threshold, then the battery pack is not in the active status.

7. The battery protection circuit of claim 6, wherein the current detecting element is a current detecting resistor, an MOS transistor, a current mirror circuit or a battery itself.

8. The battery protection circuit of claim 4, wherein the hardware protection circuit comprises at least one comparator, a reference voltage source and a first output control module, wherein each of the at least one comparator has an input terminal electrically connected to one battery unit in the battery pack to acquire a voltage of the battery unit, and has the other input terminal electrically connected to the reference voltage source to use a reference voltage of the reference voltage source as a fixed threshold, the comparator is configured to compare the voltage of the battery unit with the fixed threshold to generate a corresponding comparison result at an output terminal thereof, and the first output control module is configured to receive the comparison result and take a corresponding protective action.

9. The battery protection circuit of claim 4, wherein the software protection circuit is a Microcomputer circuit.

10. The battery protection circuit of claim 9, wherein the software protection circuit comprises an ADC module, a threshold setting module, a logic module and a second output control module, wherein the ADC module is configured to acquire a voltage of each of battery units in the battery pack and convert it into a digital signal, the threshold setting module is for use by a user to set a preset threshold, the logic module is configured to compare the preset threshold with the digital signal to generate a corresponding comparison result, and the second output control module is configured to receive the comparison result and take a corresponding protective action.

11. A battery protection method for use in a battery protection circuit to protect a battery pack, the battery protection circuit comprising a hardware protection circuit, a software protection circuit and a current detecting circuit, the battery protection method comprising:

using the current detecting circuit to detect whether the battery pack is in an active status;

using the hardware protection circuit to execute a protective operation if it is detected that the battery pack is not in the active status; and using the software protection circuit to execute the protective operation if it is detected that the battery pack is in the active status.

12. The battery protection method of claim 11, wherein the step of using the software protection circuit to execute the protective operation if it is detected that the battery pack is in the active status further comprises:

detecting for an abnormal status of the software protection circuit;

if it is detected that the software protection circuit is not in the abnormal status, then continuing to use the software protection circuit to execute the protective operation; and if it is detected that the software protection circuit is in the abnormal status, then using the hardware protection circuit instead to execute the protective operation.

* * * * *